United States Patent
Alsup et al.

(10) Patent No.: US 11,554,001 B1
(45) Date of Patent: Jan. 17, 2023

(54) ANIMAL FOOTBATH

(71) Applicant: Specialty Sales, LLC, Fresno, CA (US)

(72) Inventors: Donald Alsup, Fresno, CA (US); Gary Oliver, Jerome, ID (US)

(73) Assignee: Specialty Sales, LLC, Fresno, CA (US)

( * ) Notice: Subject to any disclaimer, the term of this patent is extended or adjusted under 35 U.S.C. 154(b) by 0 days.

(21) Appl. No.: 17/671,497

(22) Filed: Feb. 14, 2022

Related U.S. Application Data (63) Continuation-in-part of application No. 29/811,497, filed on Oct. 14, 2021.

(51) Int. Cl.
*A01K 13/00* (2006.01)
*A61D 11/00* (2006.01)

(52) U.S. Cl.
CPC ............. *A61D 11/00* (2013.01); *A01K 13/00* (2013.01); *A01K 13/001* (2013.01)

(58) Field of Classification Search
CPC .......... A61D 7/00; A61D 11/00; A01K 13/00; A01K 13/001; A01K 13/003; A47L 23/22; A47L 23/24
USPC .......................................................... 119/673
See application file for complete search history.

(56) References Cited

U.S. PATENT DOCUMENTS

| | | | |
|---|---|---|---|
| 853,533 A | 5/1907 | Byrd | |
| 1,123,094 A * | 12/1914 | Cary | ........................ A47L 23/24 15/238 |
| 1,893,482 A | 1/1933 | Bell | |
| 2,667,654 A * | 2/1954 | Goessele | ................. A47L 23/24 D6/583 |
| 2,810,671 A * | 10/1957 | Taylor | .................... B60N 3/044 428/101 |
| 2,956,565 A | 12/1957 | Anderson | |
| 2,897,963 A * | 8/1959 | Byers, Jr. | ............... B60N 3/044 206/557 |
| 2,967,763 A | 1/1961 | Doman | |

(Continued)

FOREIGN PATENT DOCUMENTS

| | | |
|---|---|---|
| CN | 202419891 U | 9/2012 |
| EP | 2163155 | 3/2010 |

(Continued)

OTHER PUBLICATIONS

US 9,838,200, Feb. 1911, Goff (withdrawn)

(Continued)

*Primary Examiner* — Peter M Poon
*Assistant Examiner* — Danielle A Clerkley
(74) *Attorney, Agent, or Firm* — Sierra IP Law, PC; Mark D. Miller (57) ABSTRACT

The present invention provides improved movable footbaths for the treatment of hooved animals. The footbaths include a watertight basin with sidewalls and end walls. The footbaths are movable for use in temporary or permanent locations. The footbaths include a cleat in the lower surface of the basin adjacent to a removable and replaceable ramp, and the ramp has a rough upper surface that provides friction for hooved animals allowing them to easily exit the footbath. After wear and tear, the ramp may be pried out or otherwise removed and replaced with a new ramp. Embodiments of the present footbath may be used to repair existing permanent footbaths, instead of destroying and rebuilding them, by inserting the movable footbath into the permanent footbath.

25 Claims, 7 Drawing Sheets

(56) References Cited

U.S. PATENT DOCUMENTS

| | | | |
|---|---|---|---|
| 3,208,434 A | 9/1965 | Barton | |
| 3,380,080 A | 4/1968 | Farrell | |
| 4,086,669 A | 5/1978 | Combis | |
| 4,126,104 A | 11/1978 | Overby | |
| 4,165,714 A | 8/1979 | Weissman | |
| 4,317,431 A | 3/1982 | Sparkes | |
| 4,445,690 A | 5/1984 | Cairns | |
| 4,446,590 A | 5/1984 | Kirchner, Jr. et al. | |
| 5,048,463 A | 9/1991 | Wilson | |
| 5,138,980 A | 8/1992 | Ewing | |
| 5,329,878 A * | 7/1994 | McCauley | A01K 1/0107 119/673 |
| 5,467,922 A | 11/1995 | Carey | |
| 5,630,379 A | 5/1997 | Gerk et al. | |
| 5,774,909 A | 7/1998 | Stable | |
| 6,003,469 A | 12/1999 | Sherwood | |
| 6,205,953 B1 * | 3/2001 | Ginn | A01K 1/0107 119/165 |
| 6,505,444 B1 * | 1/2003 | Johnson | A01K 1/0107 119/673 |
| 6,520,118 B2 | 2/2003 | Swiegers et al. | |
| 6,739,286 B2 | 5/2004 | Vander Veen | |
| 7,049,339 B2 | 5/2006 | Thomson | |
| 7,611,393 B2 | 11/2009 | Christensen | |
| D610,264 S | 2/2010 | Hess et al. | |
| 7,661,393 B2 | 2/2010 | Torgerson | |
| 7,798,104 B2 | 9/2010 | Rajkondawar et al. | |
| 7,841,299 B2 | 11/2010 | Gerk et al. | |
| RE42,247 E | 3/2011 | Veen | |
| RE42,608 E | 8/2011 | Vander Veen | |
| 8,276,545 B2 | 10/2012 | Greeson | |
| 8,347,821 B2 | 1/2013 | Murphy | |
| 8,830,068 B2 | 9/2014 | Campbell | |
| 8,925,493 B2 | 1/2015 | Torgerson et al. | |
| 9,010,277 B2 | 4/2015 | Eakin | |
| 9,149,020 B1 | 10/2015 | Murphy | |
| 9,743,636 B1 | 8/2017 | Casebolt | |
| 9,958,308 B2 | 5/2018 | Murphy | |
| 11,259,499 B2 | 3/2022 | Petersen | |
| 2003/0150397 A1 | 8/2003 | Veen | |
| 2004/0175433 A1 | 9/2004 | Thomson | |
| 2004/0216892 A1 | 11/2004 | Vander Veen | |
| 2008/0072840 A1 | 3/2008 | Rajkondawar | |
| 2008/0121189 A1 | 5/2008 | Greeson | |
| 2008/0196674 A1 | 8/2008 | Buck et al. | |
| 2008/0216762 A1 | 9/2008 | Gerk et al. | |
| 2009/0178626 A1 | 7/2009 | Greeson | |
| 2009/0223128 A1 | 9/2009 | Kuschak | |
| 2009/0283053 A1 | 11/2009 | Torgerson | |
| 2011/0000439 A1 | 1/2011 | Rajkondawar | |
| 2012/0015043 A1 | 1/2012 | Heacox | |
| 2012/0037084 A1 | 2/2012 | Thomsen et al. | |
| 2012/0090550 A1 | 4/2012 | Schlicher | |
| 2012/0174872 A1 | 7/2012 | Richards | |
| 2012/0198778 A1 | 8/2012 | MacLean et al. | |
| 2013/0098307 A1 | 4/2013 | Offhaus | |
| 2013/0098816 A1 | 4/2013 | Elfstrom | |
| 2014/0060450 A1 | 3/2014 | Kronebusch et al. | |
| 2018/0160649 A1 | 6/2018 | Hicks | |
| 2019/0045744 A1 | 2/2019 | Petersen | |
| 2019/0254797 A1 | 8/2019 | Gordon | |

FOREIGN PATENT DOCUMENTS

| | | | |
|---|---|---|---|
| FR | 2841142 A1 * | 12/2003 | ........... A01K 13/001 |
| GB | 1222078 A * | 2/1971 | ........... A01K 13/001 |
| GB | 1595893 A * | 8/1981 | ........... A01K 13/001 |
| GB | 2119622 | 11/1983 | |
| GB | 2311202 A * | 9/1997 | ........... A01K 13/001 |
| NL | 1009895 | 2/2000 | |
| NL | 1038562 | 8/2012 | |
| WO | 2007058481 | 5/2007 | |
| WO | 2012024324 | 2/2012 | |
| WO | WO2016071640 | 5/2016 | |
| WO | WO2016128684 | 8/2016 | |

OTHER PUBLICATIONS

Specialty Sales, Stainless Bath, Oct. 1, 2021, Fresno, United States.

Glendale Engineering, Bespoke Cattle Crushers, Cattle Footbath, Oct. 29, 2021, <https://www.glendaleengineering.co.uk/>, Northhumberland, UK.

CEEMEE, Preventing Lameness & Hoof Rot—Hoof Haven Foot Bath, Hoof Haven Foot Bath, Oct. 29, 2021, <https://ceemee co nz/product/hoof-haven-foot-bath/>, NZ.

Nick Bell, Foot Bath Design and Construction, Jul. 2014,<https://www.cattle-lameness.org.uk/wp-content/uploads/2014/07/Foot%20bath%20design%20and%20construction.pdf>, UK.

Fjeldass, et al, Water footbath, automatic flushing, and disinfection to improve the health of bovine feet, American Dairy Science Association, 2014.

* cited by examiner

ANIMAL FOOTBATH

PRIORITY CLAIM

This is a continuation-in-part of US design patent application Ser. No. 29/811,497 filed on Oct. 14, 2021 which is incorporated herein by this reference in its entirety.

FIELD OF THE INVENTION

The present invention relates generally to footbath systems for hoofed animals, and more particularly to a portable hoof bath having a water-tight basin for treating hoofs with a chemical or detergent solution and having an exit ramp that provides friction for animal hoofs.

BACKGROUND OF THE INVENTION

Dairy farms and cattle ranches use footbaths for treating and disinfecting the hooves or claws of livestock and cattle. A footbath may be positioned before or after a milking parlor and between walls or fencing to prevent livestock from walking around the footbath. A footbath typically includes a fluid basin having elongated side walls and shorter end walls. An entry end wall is typically provided for entering the bath and an exit end wall is provided for exiting the bath. A good footbath should be long enough such that livestock cannot jump over the bath, and wide enough that an animal cannot straddle the bath or walk through the bath with one foot out of the bath; it should be easy to fill, drain and clean. Some footbaths are wide enough to allow for two animals to enter the bath simultaneously and are more suited for large herds. In many applications, a series of foot bathing stations may be provided with a first footbath acting as a pre-washing station, an island after a pre-wash, and then a plurality of treatment baths. A footbath chemical treatment solution may include chemicals and materials to protect the hooves of animals from decay and disease, such as without limitation antimicrobial salts, copper sulfate, copper acetate, copper formate, copper, bromate, copper trichloroacetate, zinc sulfate, zinc acetate, zinc formate, zinc bromate, iron sulfate, iron acetate, iron formate, iron bromate, formalin, and various antibiotics. A footbath may be recessed into the ground, so that livestock may step down into the foot bath and may step out of the footbath. A footbath may be raised above the ground requiring cattle to step over the entry end wall into the footbath. Ramps may be used in the footbaths to prevent excess splashing and sloshing of the chemical solution when the livestock enters and exits the footbath, and provide an efficient structure that forces the claws to spread and scrape, thereby distributing a treatment solution uniformly to the hooves, and may route residual bathing solutions back into the footbath when exiting the footbath.

A dairyman will typically choose between two different footbath styles, a pre-formed or pre-constructed footbath made from plastic and/or metal, or a permanent concrete footbath. Each style has benefits and drawbacks for maintaining the footbath and for treating the hooves of cattle. A concrete footbath may be sunken below an animal walking path, may provide a rough surface for the hooves of animals, and may not be easily damaged by chemicals. However, concrete footbaths are costly, require extensive planning, cannot be removed, and cannot be easily repaired once installed. A pre-formed footbath may be made of plastic or metal which may be less expensive than a concrete footbath, and may be removable thereby making it easier to maintain or replace. However, the smooth surfaces of a plastic or metal footbath do not provide good traction for the hooves of livestock, especially on ramps leading into or out of the footbath because the hoof is subject to slipping; and the weight of the livestock may subject the temporary footbath to tipping. To address this, some metal footbaths include a metal ramp with a corrugated or diamond patterned surface to provide some friction for the hooves, but livestock is still subject to slipping on these ramps, and chemicals such as copper sulfate may corrode and rust the metal over time. Thus, there is a need for a removable and replaceable bovine footbath that is not subject to corrosion, and that includes one or more ramps with a sufficiently rough surface to allow hooved animals to enter and/or exit without slipping.

SUMMARY OF THE INVENTION

The present invention provides an improved pre-formed or pre-manufactured movable footbath that is operable for use in treating the hooves of livestock that includes one or more removable and replaceable ramps for use by animals entering and/or exiting the footbath. The footbaths of the present invention include a bottom surface having two parallel end walls, two elongated parallel side walls perpendicular to the end walls, at least one cleat and a removable ramp leading from the cleat to one of the end walls. The bottom surface and walls form a fluid basin that is operable to retain a solution for livestock to walk through for cleaning and treating their hooves. In many embodiments, the basin of the footbath may be formed from a single integrated piece that includes the bottom surface, two end walls, two elongated side walls, and at least one bottom cleat. In other embodiments, these parts (bottom surface, end walls, side walls, and cleat) may be assembled together to form the movable footbath. The footbaths of the present invention should have water-tight edges in order to provide an open-basin container operable to retain a treatment solution with a depth of a few inches. The footbaths may of the present invention be substantially rectangular and in some embodiments may have a length of at least eight feet. The footbaths of the present invention may be provided in raised positions, but may also be installed in recessed locations and before and/or after a milking parlor and may be used to replace existing footbaths, or may nest into existing damaged (concrete) footbaths thereby mitigating demolition and fabrication of a new footbath.

Embodiments of the footbaths of the present invention may have one or more cleats positioned on the bottom surface between the ends. In single-cleat embodiments, the cleat may extend across the narrow width of the footbath between the elongated side walls, and may be positioned closer to one of the end walls of the footbath than the other. The cleat may protrude up from the bottom surface of the footbath, slanting upward, and may have a right triangular cross section, such that: one side is flat along the bottom surface, one side extends up at a right angle parallel to and facing the near end wall, and the hypotenuse slants upward from the bottom surface. The slope of the hypotenuse may be established so that an imaginary line extending along the hypotenuse from the bottom surface will intersect the top of the near end wall.

Embodiments of the present invention are designed so that a ramp may be constructed along the imaginary line along the hypotenuse leading from the cleat to the top of the near end wall. In some embodiments, material such as concrete may be used to fill this space between the cleat and the near end wall, thereby creating a ramp from the bottom of the footbath to the top of a near end wall. The bottom of the ramp comprises the cleat itself, and the remainder of the ramp comprises the material filled in between the cleat and the end wall. It is to be appreciated that the closer the cleat is positioned to the near end wall, the steeper the slope of the hypotenuse (ramp) will be; and the farther the cleat is positioned from the near end wall, the flatter the slope of the hypotenuse (ramp) will be. The filled-in portion of the ramp may be removed and replaced if it is damaged.

In some embodiments, the ramp may be filled in on-site during final installation of the footbath. In some embodiments, a template may be used that follows the hypotenuse of the cleat from the cleat to the top edge of the near end wall. For example and without limitation, a template may be laid from the front edge of the cleat and extend to the top edge of the end wall, and concrete or some other suitable durable material may be poured into this space between the cleat and the end wall and allowed to cure and harden forming the ramp. The ramp may be formed to have a slope consistent with the slope of the cleat and have a complementary width to the sidewalls and the exit wall. In other embodiments, the ramp may be manufactured offsite and may be inserted during or after installation of the footbath basin. In embodiments of the invention, the upper surface of the ramp may have a rough texture to provide the friction needed to prevent slippage of the hooves of animals entering or exiting the footbath using the ramp.

In some embodiments of the invention, a single cleat and ramp may be provided. The slope of the ramp may be varied, depending on the length of the footbath and the animals that will be using it. For example and without limitation, in some embodiments the ramp may have an upward slope of between ten degrees (10°) and thirty-five degrees (35°), but usually between about ten (10°) and about twenty degrees) (20°). In these embodiments, the ramp is ordinarily used as an exit ramp to provide a frictional surface for animals to use in order to exit the footbath without slipping. However, in other embodiments, the single-cleat and ramp may be used for entry into the footbath. In some embodiments, two cleats and ramps may be provided, one for entry and the other for exit. The slopes of the two ramps may be the same or different, depending on the length of the footbath and the animals that will be using it. In many embodiments, a more gradual slope and longer ramp may be provided for exit to make it easier for animals to depart from the footbath.

Without limiting the invention, in some exemplary embodiments, the length of the elongated sidewalls may range from about ninety-four inches (94) to one-hundred and twenty (120) inches, the length of the end walls may range from about twenty-eight (28) inches to forty (40) inches, the thickness of each of the walls range from about one-half (½) inch to one and one-half (1-½) inch, and the height of the sidewall from the bottom surface to the top edge may range from about five (5) inches to nine (9) inches. In some embodiments, the depth of the treatment solution may range from three (3) to five (5) inches and may proportional to the height of the side walls, but may also be determined based on the size of the hooves of the animals expected to use the footbath. In some embodiments, the cleat may have a bottom length of about eight (8) inches and height of about one and three quarter (1-¾) inches (having a slope of approximately) 12°), the front edge of the cleat may be positioned about thirty-four (34) inches from the interior surface of the exit wall, and the ramp may fill the space there between and have a constant slope that is substantially equal to the slope of the cleat. The slope of the ramp and cleat is dependent on the location of the cleat in relation to the exit wall and the depth of the water basin but may range from 10° to 14° in many embodiments. The front edge of the ramp may align with the top edge of the cleat.

Embodiments of the ramps of the present invention may be manufactured from concrete, asphalt or other similar material and may be semi-permanently molded into the footbath at the site of the installation location, or may be premanufactured and inserted during installation. In most embodiments, if the ramp wears out, cracks or becomes unusable, a user may remove the ramp by prying it out, and/or by striking it with a chisel or jackhammer and removing the parts. Then a new ramp may be installed, or remolded, or the footbath may be moved or replaced.

The footbaths of the present invention may be manufactured from plastic or metal that is chemically resistant to chemicals used in foot treatments. For example and without limitation such chemical treatments may include antimicrobial salts, copper sulfate, copper acetate, copper formate, copper, bromate, copper trichloroacetate, zinc sulfate, zinc acetate, zinc formate, zinc bromate, iron sulfate, iron acetate, iron formate, iron bromate, formalin, organic acids, inorganic acids and various antibiotics.

In some embodiments, one or more inlets and outlets may be provided in the footbath basin. In some embodiments, a lower drain may be provided in a flat portion of the basin floor surface adjacent to the cleat. Such a drain may comprise one or more openings in an area extending across the basin floor in front of the cleat. In some embodiments, one or more inlet ports may be provided in one of the end walls, allowing for fluids such as chemicals or water to be introduced into the footbath. In some embodiments, one or more inlet ports may be provided in one or both of the side walls, allowing for fluids such as chemicals or water to be introduced into the footbath.

It is an aspect of the present invention to provide an animal footbath comprising a water-tight basin comprising a bottom surface, a pair of parallel elongated sidewalls, and a pair of parallel end walls oriented perpendicular to the pair of sidewalls, and an upwardly extending cleat located on the bottom surface, the cleat having a triangular cross section and extending between the side walls parallel to the end walls, the cleat being closer to one of the end walls than to the other of the end walls, wherein the basin is portable and may be manufactured into or formed of a single piece; and a removable ramp member provided between the cleat and the closer end wall, wherein the ramp has a slope beginning at the cleat and ending at a top edge of the closer end wall. The pair of side walls may provide a corridor for directing an animal's pathway and washing their hooves with a chemical hoof treatment solution. The ramp may include a structure operable to provide friction for the animal's hooves when exiting said footbath. The pair of parallel end walls may include an entry wall and an exit wall, wherein the closer end wall is the exit wall. Embodiments of the animal footbath may further comprise a splash guard perpendicular to a top edge of a first of said end walls and extending between said pair of side walls. The pair of parallel elongated side walls may be separated a distance ranging from twenty-eight inches to forty inches. The pair of parallel end walls may have a distance ranging from ninety four inches to one-hundred and twenty inches. The pair of parallel end walls and pair of elongated side walls may have a wall thickness ranging from one-half inch to one and one-half of an inch. The cleat may be positioned closer to one of the end walls is an exit wall. The cleat being closer to one of the end walls is a distance ranging from thirty inches to forty-two inches from the exit wall. The triangular cross-section of cleat may provide a top surface with a slope ranging from 10° to 14°. A slope of the ramp may be consistent with a slope of the triangular cross-section of said cleat. Embodiments of the footbath may further comprise an inlet pipe position on an inlet wall and may be operable to fill the water basin with a chemical solution and a drainage pipe positioned on the cleat for flushing and draining the chemical solution from the water basin.

Further aspects and embodiments will be apparent to those having skill in the art from the description and disclosure provided herein.

It is an object of the present invention to provide an improved movable footbath that includes a cleat and a removable ramp with a rough upper surface at one end for allowing a hooved animal to enter or exit the footbath without slipping.

It is an object of the present invention to provide an improved movable footbath that includes a pair of cleats and a pair of removable ramps with rough upper surfaces, one at each end of the footbath, for allowing a hooved animal to enter and exit the footbath without slipping.

It is a further object of the present invention to provide a plastic or metal footbath that is non-corrosive, easily removable and replaceable, and is operable to provide at least one removable frictional ramped surface that provides traction for a hooved animal to enter or exit the footbath without slipping.

It is a further object of the present invention to provide a movable footbath basin having a removable internal ramp that may be inserted into an existing footbath to repair or replace the existing footbath.

It is a further object of the present invention to provide a footbath having connections for receiving one or more fluid inlet pipes for receiving chemicals, medicine or water, and one or more drains for removing fluid from the footbath.

The above-described objects, advantages and features of the invention, together with the organization and manner of operation thereof, will become apparent from the following detailed description when taken in conjunction with the accompanying drawings, wherein like elements have like numerals throughout the several drawings described herein. Further benefits and other advantages of the present invention will become readily apparent from the detailed description of the preferred embodiments.

DETAILED DESCRIPTION

Reference will now be made in detail to certain embodiments of the invention, examples of which are illustrated in the accompanying drawings. While the invention will be described in reference to these embodiments, it will be understood that they are not intended to limit the invention. To the contrary, the invention is intended to cover alternatives, modifications, and equivalents that are included within the spirit and scope of the invention. In the following disclosure, specific details are given to provide a thorough understanding of the invention. However, it will be apparent to one skilled in the art that the present invention may be practiced without all of the specific details provided.

Referring to the drawings, wherein like reference characters designate like or corresponding parts throughout the several views, and referring particularly to FIGS. 1-7, it is seen that the present invention includes various embodiments of a animal footbath operable to contain fluids and treat an animals hooves with a chemical treatment solution and provide an entrance or exit ramp for animal ingress or egress.

Figure 1:
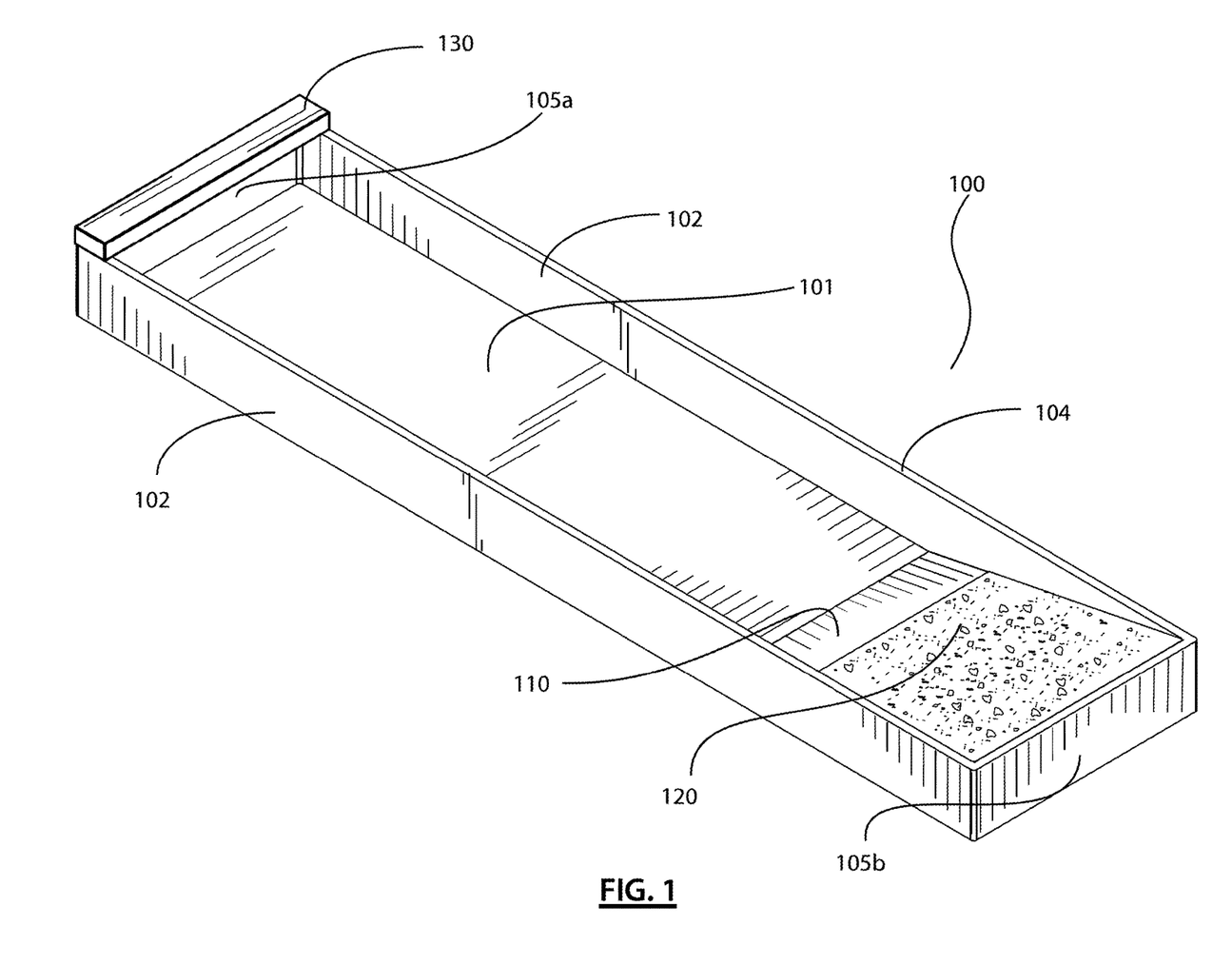
FIG. 1 is a perspective view of an embodiment of a footbath of the present invention.

Without limiting the invention, FIG. 1 illustrates an exemplary footbath 100 including a water basin comprising a bottom surface 101, a pair of parallel elongated side walls 102, a pair of parallel end walls 105 including a first end wall 105a hereinafter referred to as "inlet wall" and a second end wall 105b hereinafter referred to as "exit wall." The basin may be manufactured as a single piece, or may be constructed of several pieces with watertight engagement. The elongated side walls 102 and parallel end walls 105a, 105b may have an orientation that is substantially perpendicular to the bottom surface 101, with a water-tight seal along the edges where they meet bottom surface 101. Similarly, the junctions (corners) of the side walls 102 and end walls 105 have a water-tight seals. The walls 102, 105a, 105b may have a top edge 104.

Figure 2:
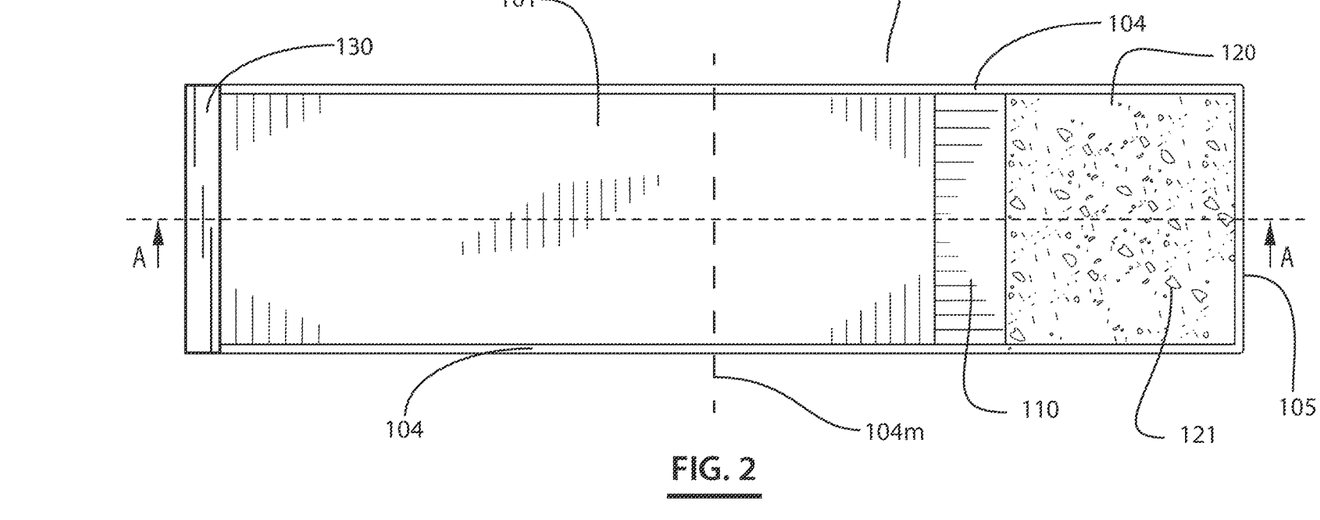
FIG. 2 is a top view of an embodiment of a footbath of the present invention.
Figure 2A:
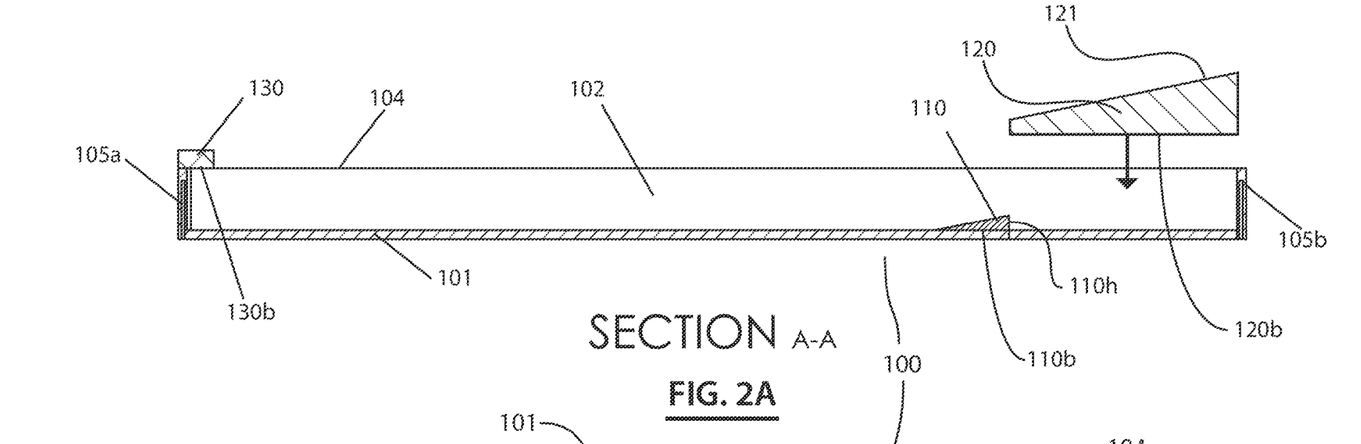
FIG. 2A is a cross-sectional side view of the footbath of FIG. 2 along line A-A.
Figure 2B:
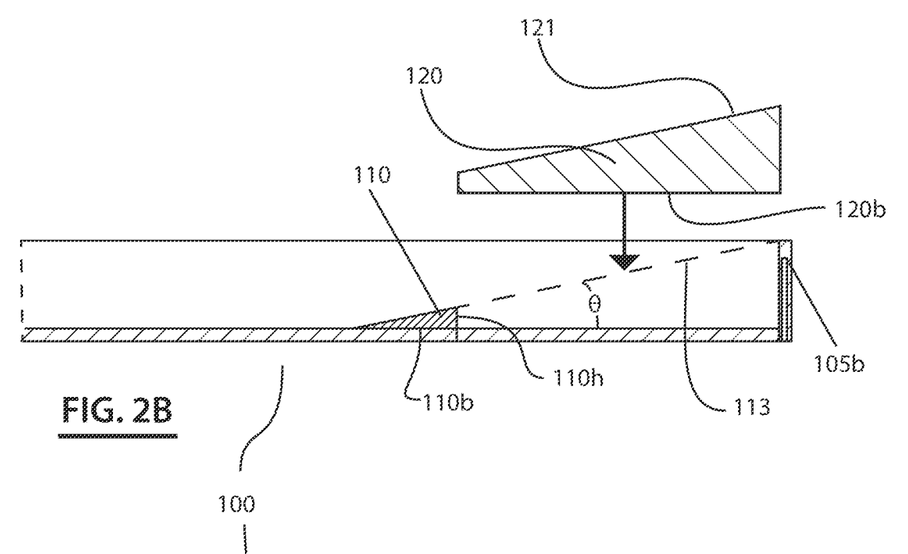
FIG. 2B is a close up cross-sectional side view of the footbath of FIG. 2 along line A-A showing an angle of an embodiment of a ramp.
Figure 2C:
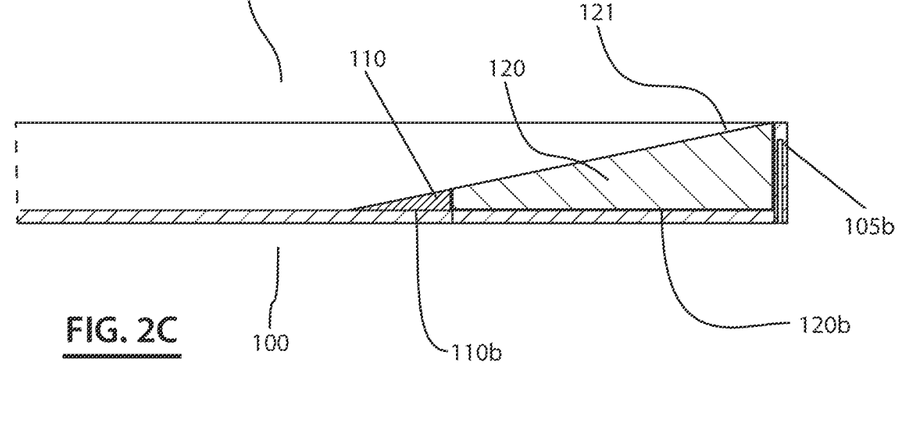
FIG. 2C is a close up cross-sectional side view of the footbath of FIG. 2 along line A-A showing an embodiment of a ramp installed in the footbath.

Embodiments of the footbath 100 may include at least one cleat 110 located on the bottom surface 101 that extends across surface 101 between the side walls 102. In the illustrated embodiment, cleat 110 is positioned between a midline 104m of surface 101 and exit wall 105b, such that it is closer to wall 105b than wall 105a. Cleat 110 may have a substantially triangular cross-section, as illustrated in FIGS. 2A-2C. The cleat 110 may protrude up from the bottom surface 101, and may have a right triangular cross section as shown in FIGS. 2A-2C, such that: one side of the cleat is along the bottom surface, one side of the cleat extends up at a right angle parallel to and facing the near end wall 105b, and the hypotenuse of the cleat slants upward from the bottom surface. The slope (θ) of the hypotenuse may be established so that an imaginary line 113 extending along the hypotenuse from the bottom surface 101 will intersect the top edge 104 of the near end wall 105b, as shown in FIG. 2B. The footbath 100 may include a ramp 120 extending from the cleat 110 to the top edge 104 of the exit wall 105b. Ramp 120 may have a slope (θ) that is consistent with the slope of the cleat 110. The slope (θ) of the ramp 120 and cleat 110 is dependent on the location of the cleat 110 in relation to the exit wall 105b and the depth of the water basin, and may range from 10° to 30°, and is typically between 10° and 20°, often close to 14° in some embodiments.

Embodiments of the present invention are designed so that a ramp 120 may be constructed along the imaginary line 113 leading from the cleat 110 to the top of end wall 105b. The front edge of the ramp 120 may align with the top edge of the cleat 110. In some embodiments, the ramp 120 may be manufactured and installed at on site footbath location. In such embodiments, a template may be used to form the shape of the ramp 120, for example, a template may be laid from the front edge of the cleat 110 and extend to the top edge 104 of the exit wall 105b, and concrete, asphalt or other material may be poured into the space between the footbath and the template and may be formed to have a slope (θ) consistent with the slope of the cleat 110, and have a complementary width to the side walls 102 and the exit wall 105b. In some embodiments, the ramp 120 may be manufactured off-site and installed into the footbath 100 on-site, as shown in FIG. 2A. The ramp 120 may provide a rough upper surface 121 operable to prevent slipping of a hoofed animal when exiting the water basin and may agitate the hooves and separate the claws to provide deeper penetration of the footbath solution into the hoof. A concrete or asphalt ramp may be subject to fracture over time and may be removed from the footbath by prying, chiseling and/or breaking the ramp for removal and replacement by re-pouring the concrete or asphalt to form a new ramp.

The ramp 120 may be made of concrete, asphalt or other suitable material, and may have a rough, textured and/or frictional top surface 121 that is suitable to help prevent animal hooves from slipping thereon. The side walls 102, end walls 105, bottom surface 101 and cleat 110 may be manufactured as a single piece, either from polymeric materials through extrusion, injection, or molding manufacturing methods; or form a metal mold. In other embodiments, side walls 102, end walls 105, bottom surface 101 and cleat 110 may be separate pieces (made of metal or plastic) that may be joined together in a watertight manner. In some embodiments, the inlet wall 105a may have a splash guard 130 that is operable to prevent the water or water-chemical mixture from splashing out of the footbath 100 when an animal enters into the water basin.

Without limiting the invention, in some embodiments, the length of the elongated side walls 102 may range from about ninety-four inches (94) to one-hundred and twenty (120) inches, the length of the end walls 105 may range from about twenty-eight (28) inches to forty (40) inches, the thickness of each of the walls range from about one-half (½) inch to one and one-half (1-½) inch, and the depth from the top edge 104 to the bottom surface 101 may range from about five (5) inches to nine (9) inches. In some embodiments, the parallel side walls 102 may have a width operable to accommodate two cows simultaneously. The cleat 110 may have a bottom length of about eight (8) inches and height of about one and three quarter (1-¾) inches, the front edge of the cleat 110 may be positioned about thirty-four (34) inches from the interior surface of the exit wall 105b and the ramp 120 may fill the space there between and have a constant slope that is substantially equal to the slope of the cleat 110.

Figure 3:
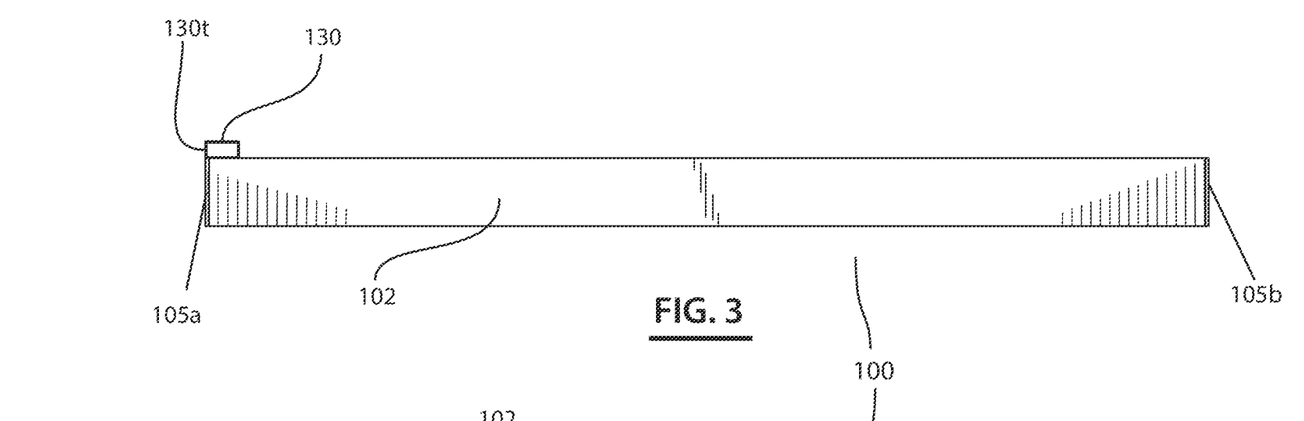
FIG. 3 is a side view of an embodiment of a footbath of the present invention.
Figure 4:
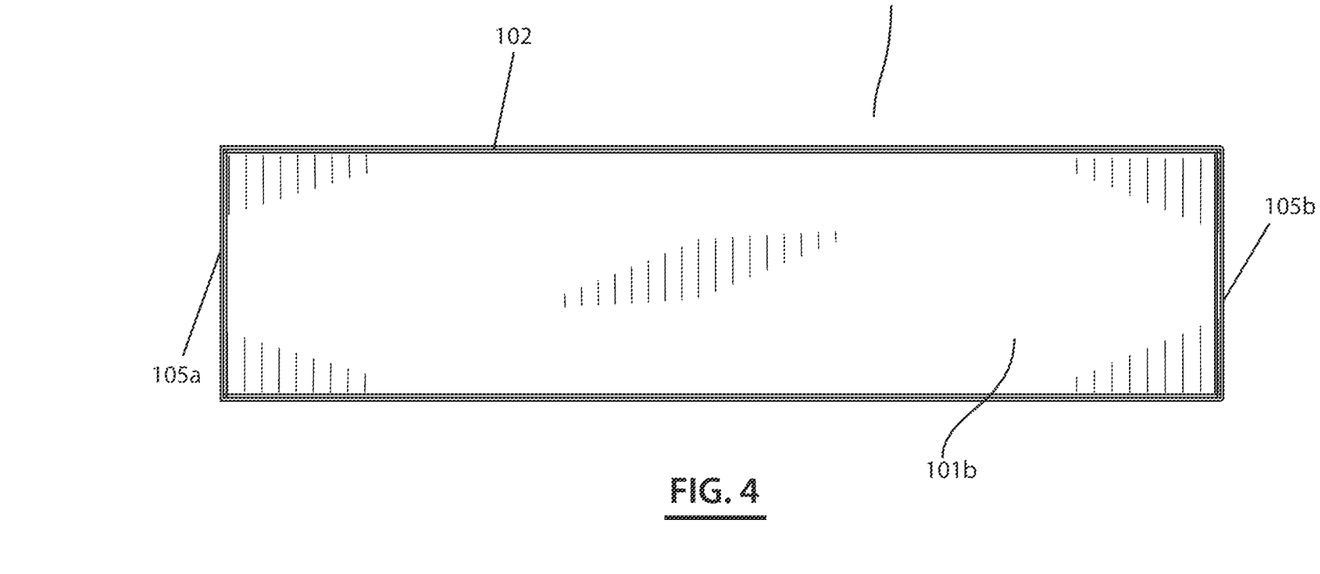
FIG. 4 is a bottom view of an embodiment of a footbath of the present invention.
Figure 5:
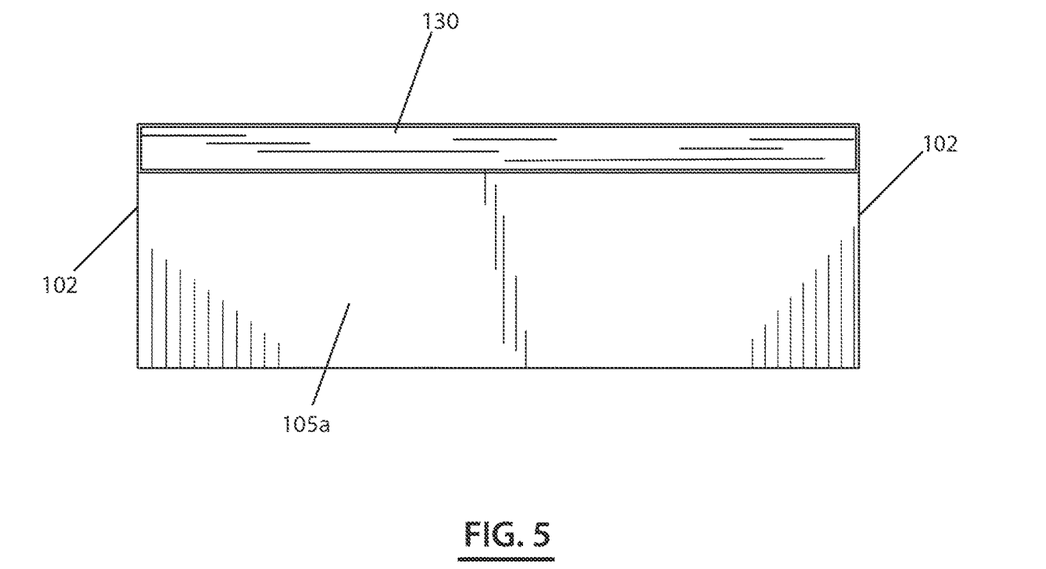
FIG. 5 is an end view of an embodiment of a footbath of the present invention.

In some embodiments, a splash guard may be positioned at the ingress side of a foot and may be operable to shield sloshing water when an animal enters the footbath 100, thereby containing the chemical solution within the footbath. FIG. 3 illustrates a side view of an exemplary footbath 100 with an optional splash guard 130 positioned on the top edge 104 of the inlet wall 105a. In some embodiments, splash guard 130 may have a thickness 130t of ranging from 1-3 inches and may have a bottom length 130b ranging from four (4) to seven (7) inches that extends from the exterior surface of the inlet wall 105a into the walking area of the footbath. The splash guard 110 may be constructed of a material similar to the footbath 100 and/or may be installed separately. FIG. 4 illustrates the bottom surface 101b having a flat planar surface that is level. FIG. 5 illustrates the footbath 100 and the inlet wall 105a, the splash guard 130 may have a width extending from each of the parallel side walls 102.

Figure 6:
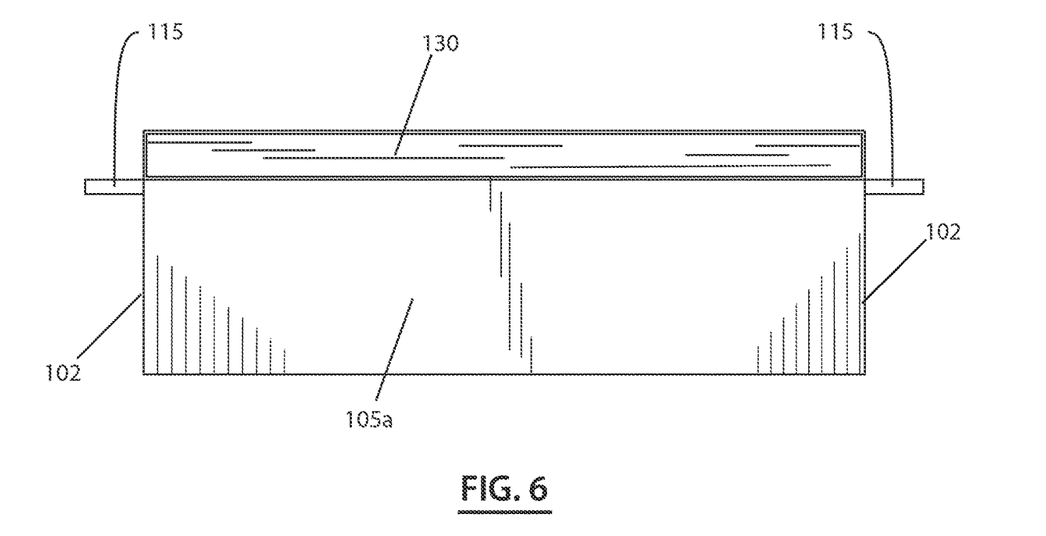
FIG. 6 is an opposite end view of an embodiment of a footbath of the present invention.
Figure 7:
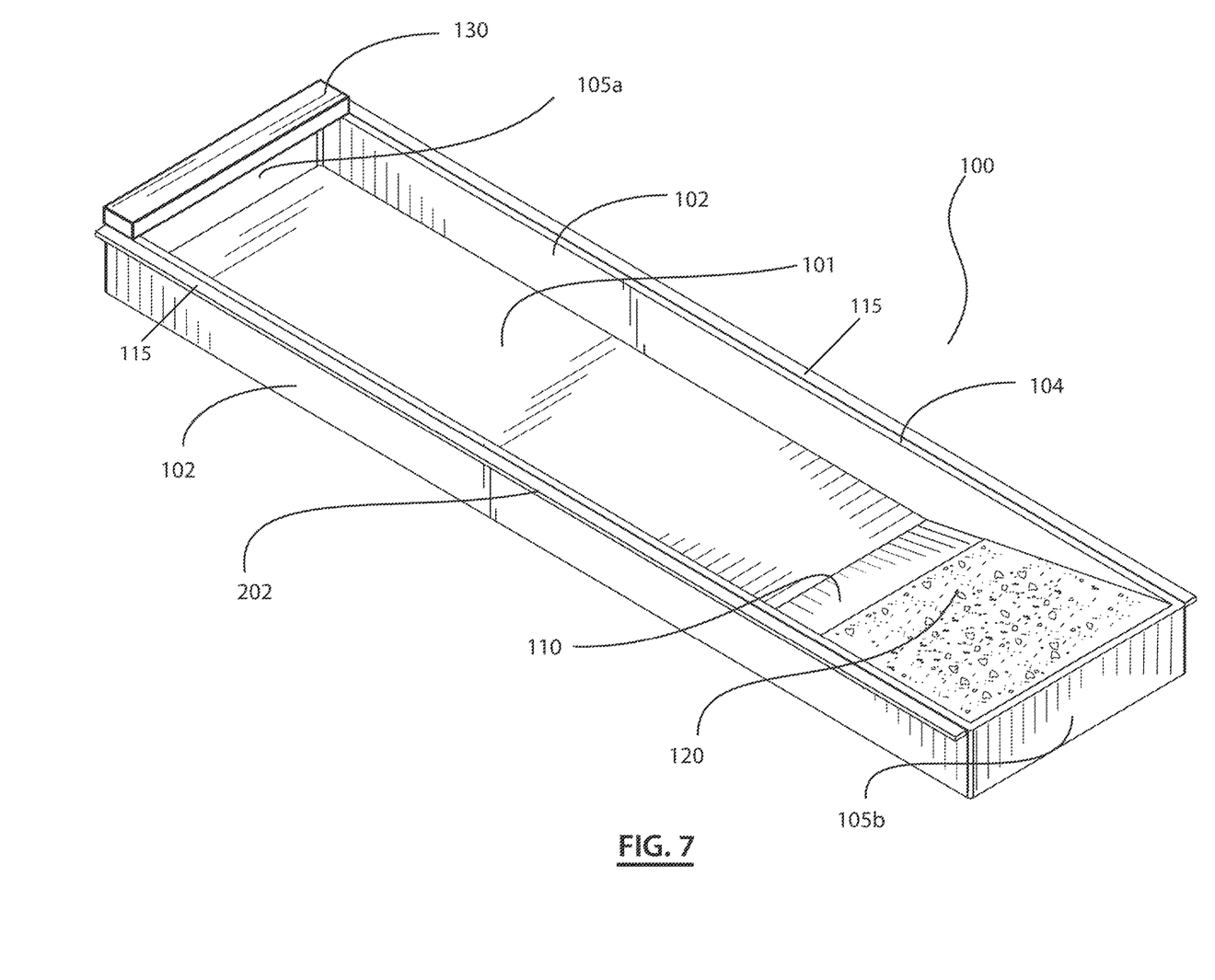
FIG. 7 is a perspective view of an alternative embodiment of a footbath of the present invention having side flanges.
Figure 8:
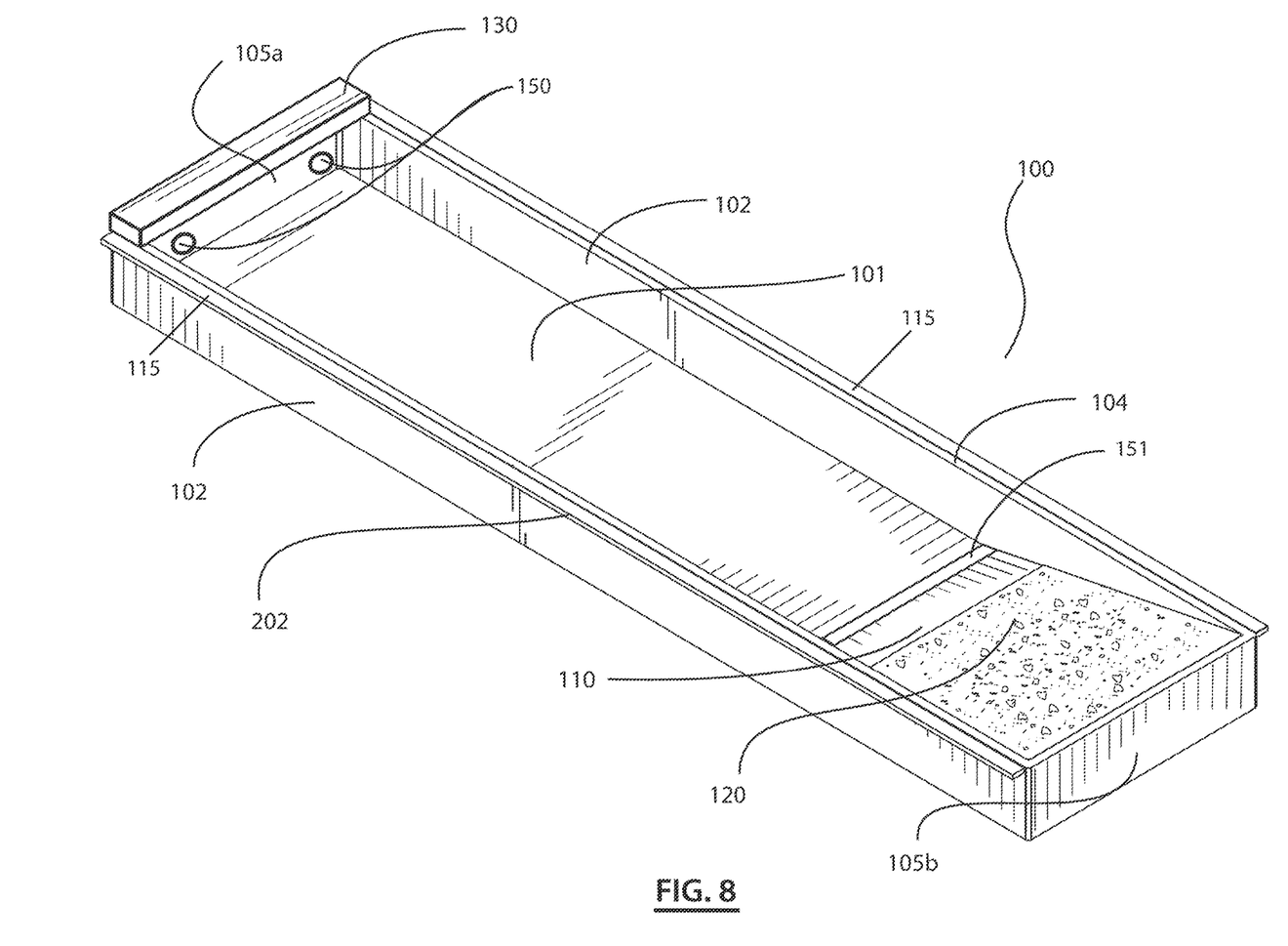
FIG. 8 is a perspective view of an alternative embodiment of a footbath of the present invention having side flanges, fluid inlets and drain.

In some embodiments, the footbath 100 may include an optional flange 115 that is operable to position and align the footbath with the ground or existing footbath when installed into a recessed position. The flange 115 is illustrated in FIGS. 6-7 and is positioned parallel to the bottom surface 101 and perpendicular to the side walls 102. The flange may share a surface with the top edge 104. In such embodiments, the flange may be operable to provide a structure suitable for fastening a footbath of the present invention into the ground for a permanently fixed position. These embodiments may be installed over and into an existing permanent (e.g., in-ground concrete) footbath that have become unusable (e.g., leaking) thereby preventing demolition. The flange 115 may provide a surface for fastening the footbath 100 to the sidewalls of a pre-existing concrete or other footbath and is suitable for both recessed and raised footbath applications.

In some embodiments, the footbath 100 may be equipped with fluid inlets 150 and on or more drains 151 as illustrated in FIG. 7. The fluid inlet pipe 150 may be positioned at the entry wall 105a and may be operable to couple to hoses or lines of a fluid pump that are operable to fill the water basin with a chemical solution or water. A drain 151 may be integrated into the cleat of the footbath and an actuator (not shown) may be operable to open the valve for draining the solution.

A footbath 100 may be manufactured without ramp 120, and transported to a final destination, with ramp 120 being installed at the destination. In other embodiments, ramp 120 may be pre-installed, and the completed footbath may be transported to the destination. The final destination may be a temporary location or a fixed location. For example, a temporary location may configure the footbath 100 with the bottom surface 101 on the ground in an open environment where livestock may be driven through the footbath 100 stepping over the inlet wall 105a and into the basin 101, and then walk up the ramp 120 stepping down from the exit wall 105b back onto the ground. In a fixed location, the footbath may be placed into a hole that is dug out of the ground or cut into concrete, or may be fitted into an existing trench or pre-existing permanent footbath as an alternative to demolition of the pre-existing footbath and construction of a new permanent footbath.

It is to be understood that variations and modifications of the present invention may be made without departing from the scope thereof. In particular, and without limitation, each of the various features and/or aspects of each embodiment disclosed herein may be used with other features and/or aspects of other embodiment disclosed herein in different combinations. Other combinations of features of the various embodiments disclosed herein are also included within the scope of the invention. It is also to be understood that the present invention is not to be limited by the specific embodiments disclosed herein, but only in accordance with the appended claims when read in light of the foregoing specification.

What is claimed is:

1. An animal footbath comprising:
    a. a watertight basin comprising a bottom surface, a pair of parallel elongated side walls and a pair of parallel end walls oriented perpendicular to said side walls forming a rectangular shape, and an upwardly extending cleat located on said bottom surface, said cleat having a triangular cross section and extending between said side walls parallel to said end walls, said cleat being closer to one of said end walls than to the other of said end walls, said cleat having an upper surface sloping upward from the bottom surface to a top of the cleat; and
    b. a removable ramp member provided in said basin between said cleat and the closer of said end walls, wherein said ramp member has an upper surface with a slope beginning at the top of said cleat and ending at a top edge of said closer end wall.

2. The footbath of claim 1 wherein said bottom surface, side walls, end walls and cleat are formed in a single integrated piece.

3. The footbath of claim 1 wherein said bottom surface, side walls, end walls and cleat are attached together with watertight seals to form said basin.

4. The footbath of claim 1, wherein said ramp member is removable and replaceable.

5. The footbath of claim 1, wherein the upper surface of said ramp member has a rough texture.

6. The footbath of claim 1, wherein the cross section of said cleat is in the form of a right triangle such that a first side of the cleat is along said bottom surface, a second side of the cleat extends up at a right angle from the bottom surface, said second side of the cleat being parallel to and facing said closer end wall, and a third side of the cleat defines a hypotenuse that slopes upward at an angle from the bottom surface.

7. The footbath of claim 6, wherein the angle of the third side of said cleat is about the same as the slope of said ramp member.

8. The footbath of claim 7, wherein the angle of the third side of said cleat and the slope of said ramp member is less than thirty degrees.

9. The footbath of claim 7, wherein the angle of the third side of said cleat and the slope of said ramp member is less than twenty degrees.

10. The footbath of claim 7, wherein the angle of the third side of said cleat and the slope of said ramp member is less than fifteen degrees.

11. The footbath of claim 7, wherein the angle of the third side of said cleat and the slope of said ramp member is between about ten degrees and about fifteen degrees.

12. The footbath of claim 1 wherein said ramp member is in the form of concrete that is poured into said basin between said cleat and said closer end wall after said basin has been installed at a physical location.

13. The footbath of claim 1 wherein said ramp member is pre-formed, and is inserted into said basin after said basin has been installed at a physical location.

14. The footbath of claim 1 wherein said ramp member is pre-formed, and is inserted into said basin before said basin is installed at a physical location.

15. The footbath of claim 1 further comprising a splash guard provided along a top edge of the other of said end walls extending between said pair of side walls.

16. The footbath of claim 1 further comprising at least one inlet pipe on said other of said end walls being operable to fill said basin with a fluid solution, and at least one drain on said bottom surface adjacent to said cleat.

17. The footbath of claim 1 wherein a second upwardly extending cleat is provided on the bottom surface of said basin, said second cleat having a triangular cross section and extending between said side walls parallel to said end walls, said second cleat being closer to the other of said end walls, said second cleat having an upper surface sloping upward from the bottom surface to a top of the second cleat; and a second ramp member provided in said basin between said second cleat and said other end wall, wherein said second ramp member has an upper surface with a slope beginning at the top of said second cleat and ending at a top edge of said other end wall.

18. The footbath of claim 17, wherein the upper surfaces of both of said ramp member and said second ramp member have a rough texture.

19. The footbath of claim 17, wherein the cross section of both of said cleat and said second cleat is in the form of a right triangle such that a first side of each cleat is along said bottom surface, a second side of each cleat extends up at a right angle from the bottom surface, said second side of said cleat being parallel to and facing the end wall closest to said cleat and said second side of said second cleat being parallel to and facing the other end wall closest to said second cleat, and a third side of each cleat defines a hypotenuse that slopes upward at an angle from the bottom surface.

20. The footbath of claim 19, wherein the angle of the third side of each cleat is about the same as the slope of the adjacent ramp member.

21. A method of installing an animal footbath at a location comprising the steps of:
    a. fabricating a watertight basin comprising a bottom surface, a pair of parallel elongated side walls and a pair of parallel end walls oriented perpendicular to said side walls forming a rectangular shape, and an upwardly extending cleat located on said bottom surface, said cleat having a triangular cross section and extending between said side walls parallel to said end walls, said cleat being closer to one of said end walls than to the other of said end walls, said cleat having an upper surface sloping upward from the bottom surface to a top of the cleat;
    b. creating a rectangular trench in a surface;
    c. sizing said trench to receive said basin;
    d. placing said basin into said trench; and
    e. installing a ramp member into said basin between said cleat and the closer of said end walls, wherein said ramp member has an upper surface with a slope beginning at the top of said cleat and ending at a top edge of said closer end wall.

22. The method of claim 21 wherein the step of installing said ramp member comprises the steps of bringing a prefabricated ramp member to said basin and dropping said ramp member into said basin between said cleat and the closer of said end walls.

23. The method of claim 21 wherein the step of installing said ramp member comprises the steps of:
    a. temporarily installing a sloped template in said basin extending between the top of said cleat and the top edge of the closer of said end walls creating a space below said template;
    b. pouring a curable material into said space;
    c. allowing said material to harden forming said ramp member; and
    d. removing said template.

24. The method of claim 21 comprising the additional step of removing said ramp member and replacing it with another ramp member having the same shape.

25. The method of claim 21 wherein the step of creating the rectangular trench in a surface comprises removing an existing basin from the surface leaving a rectangular opening in said surface thus defining the rectangular trench.

\* \* \* \* \*